Nov. 11, 1941.  K. A. HARMON  2,262,532
DYNAMOELECTRIC MACHINE
Filed July 26, 1939    2 Sheets-Sheet 1
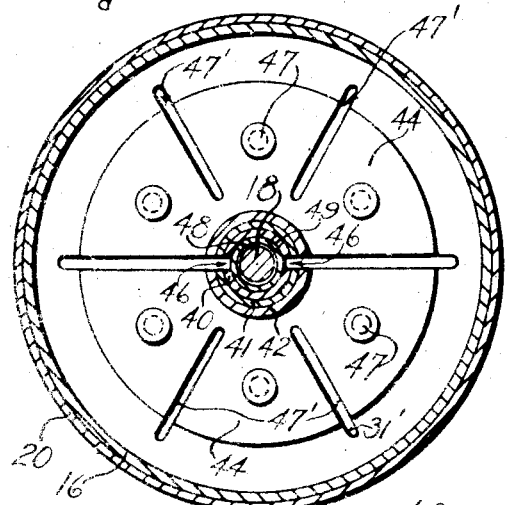
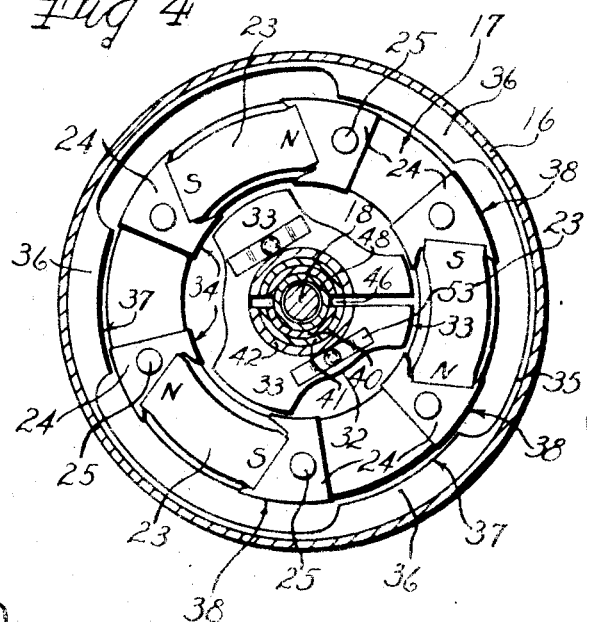
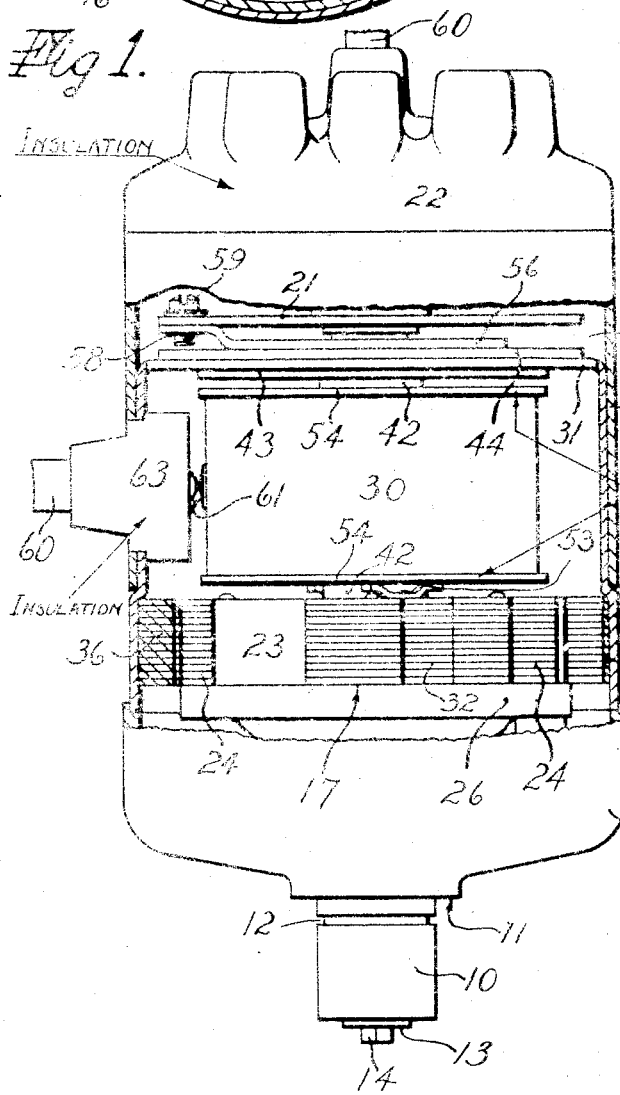
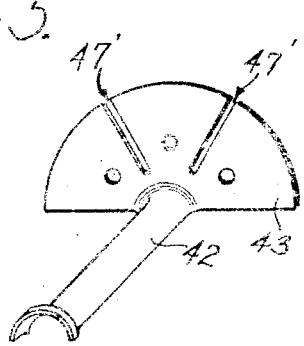
INVENTOR
KENNETH A. HARMON
BY
Chapin & Neal
ATTORNEYS Nov. 11, 1941.   K. A. HARMON   2,262,532
DYNAMOELECTRIC MACHINE
Filed July 26, 1939   2 Sheets—Sheet 2

INVENTOR
KENNETH A. HARMON
BY
Chapin & Neal
ATTORNEYS

Patented Nov. 11, 1941

2,262,532

UNITED STATES PATENT OFFICE 2,262,532

DYNAMOELECTRIC MACHINE

Kenneth A. Harmon, Longmeadow, Mass., assignor to Wico Electric Company, West Springfield, Mass., a corporation of Massachusetts Application July 26, 1939, Serial No. 286,659

12 Claims. (Cl. 171—209)

This invention relates to improvements in dynamo electric machines, whether of the generator or motor type. The improvements relate particularly to the armature structure and, more especially, to the construction and mounting of the magnetic flux-conducting members thereof.

The armature structure, with which this invention is concerned, is of that type which includes a generating coil and flux-conducting means extending from one end of such coil axially through the same to the other end thereof, thence radially outward and thence in a direction parallel to the axis of the coil but outside the same to the first-named end thereof. Flux is directed alternately in opposite directions through said means by a rotor which cooperates with the terminals of said means which are all located near the first-named end of the coil. The rotor is usually, although not necessarily, of the permanent magnet type.

The flux-conducting arrangement described is a desirable one for magnetos of the so-called "timer" type, which are adapted to be mounted in place of the timer-distributor unit of an automobile for example, and for other magnetos or other kinds of dynamo electric machines, where an exceptionally compact arrangement of parts is required.

One of the chief difficulties presented by this type of machine is that of providing a flux-conducting structure which has satisfactory magnetic characteristics, and which can at the same time be manufactured at a reasonable cost. A common form of prior art structure includes a plurality of angularly-spaced, laminated members of inverted U-form with one leg of each U-shaped member passing axially through the generating coil. The problem is to support these members in a mechanically satisfactory way and at a reasonable cost. One way of accomplishing the result, which approaches closely to satisfactory mechanical form, is to inset these laminated members into the body of a molding of suitable material, such as one of the plastics for example. This arrangement, however, is more expensive than is desired.

This invention has for an object to provide a flux conducting structure for a dynamo electric machine of the type set forth, which can be manufactured at a cost substantially lower than any that have heretofore been provided, and which affords sufficiently good magnetic qualities and mechanically a much stronger structure.

More particularly, the invention has for an object the provision of a flux-conducting structure made up of magnetizable sheet metal having a section which is thin enough to enable it to be drawn, rolled, or otherwise readily fabricated and which will not result in any great hysteresis loss. The outer member of the structure is a thin cylindrical shell which, however, is of sufficiently large enough diameter to provide the necessary cross sectional area. This shell can, and preferably also does, serve as the casing for the machine. The core of the structure, being of relatively small diameter, is formed of several of the thin sheet metal members. The connecting part between the shell and core is likewise made of several sheet metal members to afford a composite wall which increases in thickness from a minimum near the shell to a maximum near the core. A relatively few pieces are required as against the relatively large number of laminations used for the same purpose in prior art structures.

The invention also provides a structure wherein the coils are completely surrounded by magnetic members and thus fully shielded. The structure is also such that there is much less stray magnetism and a better and fuller utilization of the flux is possible.

These and other objects will best be understood as the detailed description proceeds and they will be pointed out in the appended claims.

The invention will be disclosed with reference to the accompanying drawings in which:

Fig. 1 is a small scale elevational view of a magneto embodying the invention, parts being broken away to show that portion of the internal construction with which this invention is particularly concerned;

Figure 2:
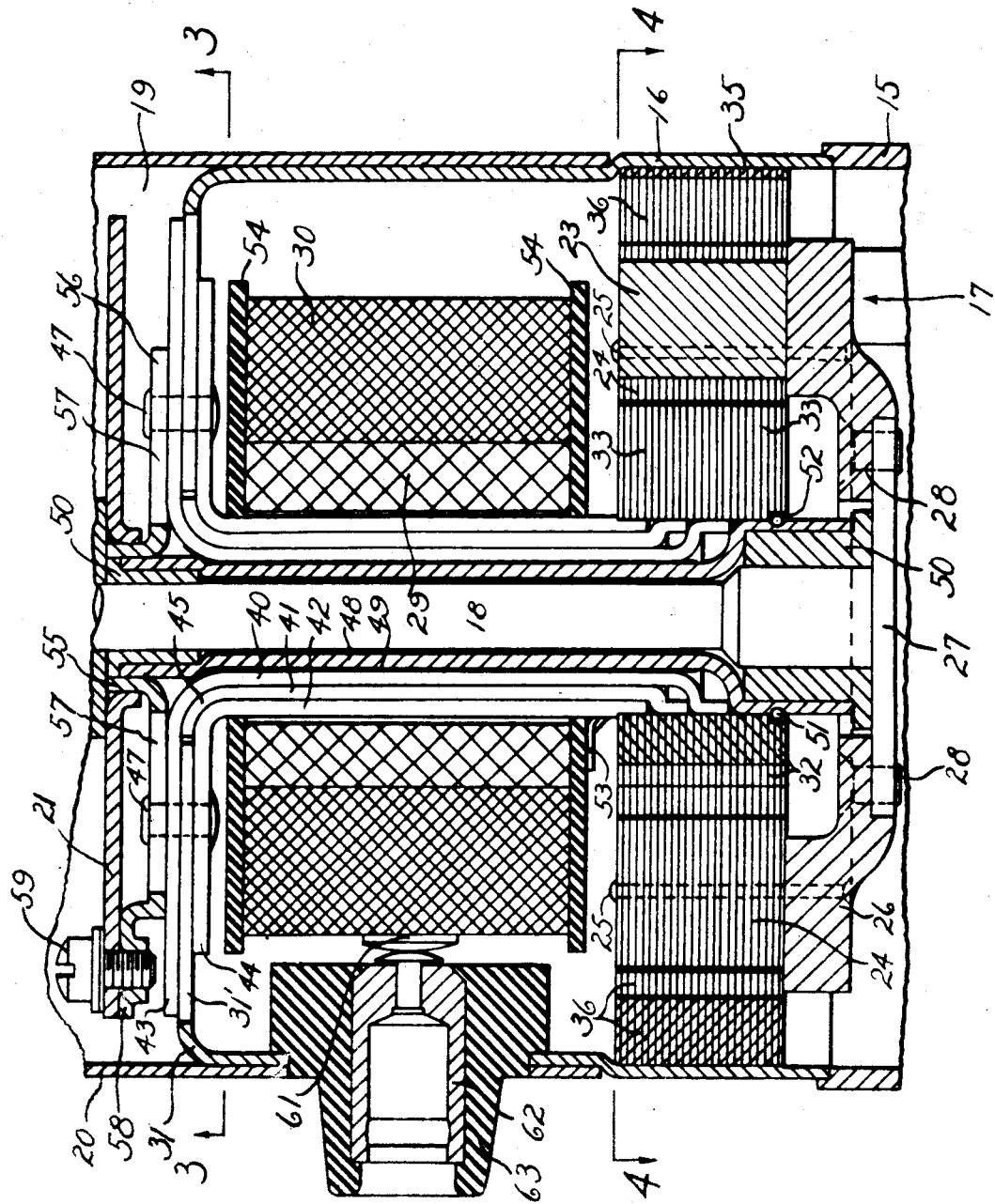
Fig. 2 is an enlarged sectional view of the portion shown broken away in Fig. 1.

Figs. 3 and 4 are cross sectional views taken on the lines 3—3 and 4—4, respectively, of Fig. 2; and Fig. 5 is a perspective view of one of the core sections.

Referring to these drawings, the invention has been shown in connection with a magneto of the magnetic-rotor type as an illustrative example of one kind of dynamo electric machine in which the invention may be embodied. The invention, however, is capable of use with other forms of dynamo electric machines and is not to be limited to the one specific type herein disclosed.

In Fig. 1, the complete magneto is shown, drawn to a small scale. This magneto may, for example, be of the same general construction (except of course for the armature) as that disclosed in my copending application for U. S.

Letters Patent Serial No. 253,025, filed Jan. 26, 1939. The particular magneto shown is adapted to be mounted in place of the timer-distributor unit of an automobile engine and includes a hub or quill 10 which is adapted to fit into a socket in the crankcase of the engine, seating on the shoulder 11 and being held against axial movement by any suitable means engaged in the circumferential groove 12. The hub 10 rotatably supports a drive shaft 13 having a part 14 for coupling engagement with some suitable driving member within the crankcase of the engine. The hub 10 is part of a cup-shaped casing 15 upon which is supported a second casing 16, made of magnetizable sheet metal and housing within it the armature structure and a magnetic rotor 17. The rotor is driven from shaft 13 in any suitable manner, as for example by the means disclosed in said application, which means provides for an automatic advance of the spark. The rotor has fixed thereto a shaft 18, coaxially disposed with relation to shaft 13 and extending upwardly through shell 16 into a compartment 19 within a cylindrical shell 20. This shell may be of any suitable material. It may even be made of sheet metal as is the shell 16, but usually the latter has sufficient cross sectional area for the magnetic purpose and so the shell 20 is not needed magnetically. This compartment 19 houses suitable breaker point mechanism which is mounted on a plate 21 and actuated from the shaft 18, all as disclosed in said application. As shown herein, shell 20 is partially telescoped over shell 16 and held thereto by a press fit. Superposed on the shell 20 is a distributor cap 22, within which is housed a suitable distributor actuated from shaft 18 as disclosed in said application.

The magnetic rotor 17 includes a circular series of permanent magnets 23 (Fig. 4) and a pair of pole shoes 24 for each magnet. Each of these magnets is suitably held to and between its pair of pole shoes and the latter are riveted, as at 25, or otherwise suitably fixed to the upper face of a non-magnetic base plate 26 which supports them. The shaft 18 has on its lower end a circular flange 27 (Fig. 2), which fits into a recess in the lower face of the base plate 26 and is secured thereto by rivets 28 or any other suitable means.

The armature structure includes primary and secondary coils 29 and 30, respectively, and flux conducting members affording a magnetic path which extends axially through the coils from one end to the other thereof, thence radially from the upper end of the coils and then in a direction parallel to said axis but outside the coils to a position adjacent the lower end of the coils. The last-named part of the path is through the above-described casing 16. This member, formed in any suitable way from sheet metal which is magnetizable, has an integral radially inturned part 31, providing for part of the radial path described. The axial path through the coils is provided by a multi-part hollow core through which the shaft 18 extends. The lower end of the core has fixed thereto a laminated iron member 32 having a plurality (three as shown) of equally-spaced pole pieces 33 having convex finished surfaces 33' for cooperation with concave finished surfaces 34 on the pole pieces 24, all such surfaces being coaxial with respect to shaft 18. The shell 16 at its lower end has fixed therein a laminated iron member 35 having a plurality (three as shown) of equally-spaced pole pieces 36, having concave surfaces 37 for cooperation with the convex surfaces 38 of said pole pieces, all such surfaces being coaxially disposed relative to shaft 18. The cooperating surfaces 33' and 34 and the cooperating surfaces 37 and 38 are in exceedingly close proximity and are separated only by a very small clearance. In the drawings, these clearances have been exaggerated to secure clearness of illustration.

The core is made up of a plurality of pairs of members of magnetizable sheet metal, such as those shown at 40, 41 and 42. Each of these members is of hollow semi-cylindrical form. The members 40 and 42 have semi-circular flanges 43 and 44, respectively, turned outwardly from their upper ends while each member 41 has at its corresponding end a curved part 45. One member, as 42, is shown separately in Fig. 5. As shown, two of the members 40 are used to form between them a member which is hollow and substantially cylindrical except for the gaps 46 between the two members 40. These gaps prevent the formation of eddy currents in the composite tubular member. The members 41 and 42 also afford composite tubular members with gaps similar to 46 and alined therewith (see Fig. 4), between the sections of each composite member. The curved parts 45 of members 41 are clamped between the corresponding parts of members 40 and 42, when the flanges 43 and 44 of the last-named members are fastened, as by rivets 47, to the part 31 against which they abut. The flanges 43 and 44 have radial slots 47' therein, each extending from the outer periphery inwardly to a position much closer to the shaft 18 than are the rivets 47. The part 31 is provided with slots 31' registering with slots 47'. These slots are provided, one between each pair of adjacent rivets 47, and they break up the electrical circuit that would otherwise exist through the adjacent rivets and through the flanges 43 and 44 in a plane at right angles to the radial lines of magnetic flux in said flanges. The core may, and preferably does, include an inner tubular member 48 made in one piece and lacking any gaps similar to gaps 46. Insulation 49 is applied between tube 48 and the pair of core members 40, so that the tube 48 cannot bridge the two gaps 46 and electrically connect the members 40. The inner tubular part 48 acts to shield the shaft against the production of eddy currents and prevent the resulting heating of the same.

The member 48 at each end is swaged out to receive flanged bearing sleeves 50 which are held therein by a drive fit and which rotatably support the shaft 18. At its lower end, member 48 has a circumferential groove therein to receive a split ring 51 which also lies in a counterbore 52 of the laminated member 32 and serves to hold the latter in position. Fixed to the member 32 are a series of springs 53 which engage the lower insulated head 54 of the coil unit and press the latter upwardly as far as it will go (as herein shown it is limited by the size of the hole in the upper head 54).

The plate 21, for supporting the breaker mechanism is mounted to turn on the hub 55 of a plate 56 which rests on top of the flanges 43 and is held in place by the rivets 47. This plate 56 is suitably slotted, as at 57, between each pair of rivets 47 for the same reasons that the flanges 43 and 44 are slotted. Plate 56 has an upwardly extending, internally threaded hub 58 and a cap screw 59, extending through a slot in plate 21, is threaded into this hub and serves to hold the plate 21 in its various positions of adjustment.

The electrical connections of the magneto have not been shown except for the wire 60 which is shown in part and as indicated, connects one terminal 61 of the secondary coil to the distributor. This wire has an end which fits in metallic socket 62. This socket, which is fixed in an insulator 63 mounted in an overlapping portion of the shells 16 and 20, connects with the terminal 61 (Fig. 2). The remaining electrical connections are, or may be, the same as disclosed in the above identified application, to which reference is made for a more complete disclosure.

In operation, the magnetic rotor, as it turns, establishes magnetic circuits through the armature first in one and then in the opposite direction. When all of the pole shoes 24 of north polarity are overlapped by the pole pieces 36, magnetic flux from the several magnets travels upwardly through shell 16, thence radially inward through the composite member 31—43—44 to the composite core 40—41—42—48, thence downwardly through said core and thence to the pole pieces 33 and back to the pole shoes 24 of south polarity. When the rotor moves from this position through an angle of sixty degrees, the pole shoes 24 of north polarity now overlap the pole pieces 33 and the pole shoes 24 of south polarity are now overlapped by the pole pieces 36. Accordingly, the magnetic flux now passes up the composite core and across the composite member 31—43—44 and down through the shell 16. Thus, six times during each revolution a magnetic circuit through the generating coil is broken and a reverse circuit established and these six reversals are utilized in the usual and well-known way and as fully pointed out in the above identified application, to produce ignition sparks.

The present invention provides a magnetic structure for the armature of the magneto. This structure is simple, strong and cheap to manufacture and yet affords sufficiently good magnetic qualities for the purpose. The parts are susceptible to manufacture in quantities at low unit cost. All the parts are made of thin sheet metal. The metal is thin enough to enable the parts to be drawn into the form shown and thus these parts may be fabricated in quantities very inexpensively. The assembly of parts is exceedingly simple and requires only the application of a few rivets to rigidly bind together all parts of the magnetic structure of the armature. Only a few parts are involved, eight in this case, to do the equivalent of the several stacks of many laminations used in prior art structures. The core parts are held rigidly in place and therefore can be used to support the bearings for the rotor shaft 18. The shell 16 is utilized also as a casing element, thus saving space and enabling the diameter of the magneto to be reduced over that heretofore required. The magnetic structure described is much easier to machine than the prior art structures because the shell 16 and core extend completely around the axis and can be finished with smooth cuts as distinguished from the prior art structures where the laminations are located in spots only and do not extend completely around the axis.

The magnetic structure is satisfactory in operation. The shell 16 may be made very thin, say for example one thirty-second of an inch, and still afford all the cross sectional area that is needed because the mean diameter of the shell is relatively large. The core, the mean diameter of which is relatively small, is made much thicker (from four to five times) in order to get the cross sectional area desired. The horizontal and radial composite connecting part, of annular form, is made of varying thickness, increasing progressively from a minimum near the shell 16 to a maximum near the core. By the use of thin metal the hysteresis loss is kept within reasonable limits. By slotting the flanges 43 and 44 and by spacing apart the sections from which each tubular core section is made, eddy currents are prevented. The inner core 48 serves as a shield for shaft 18, preventing the formation of eddy currents therein. The coils 29 and 30 are completely surrounded by magnetic members and thus shielded. A substantial reduction in loss by stray magnetism has been effected and a much more complete utilization of the magnetic flux (getting as much as possible of it into the coils) has been effected.

The invention thus affords a materially improved magnetic structure for the armature of a magneto or other form of dynamo electric machine and enables substantial savings in cost to be effected and, at the same time, a better and more rigid structure is provided

What I claim is:

1. A flux conducting structure for the armature of a dynamo electric machine, comprising, a thin-walled tubular member of relatively large mean diameter and of magnetizable sheet metal, a tubular core of relatively small mean diameter and located in and coaxially of said member, means connecting one end of the tubular member to the corresponding end of said core, said core and said means being also of magnetizable sheet metal, said core being a composite one made up of a plurality of coaxially-disposed tubes each constructed of a plurality of angularly-spaced sheet metal sections of part-cylindrical form, a series of angularly-spaced pole pieces carried by the other end of said core, and another such series of pole pieces carried by the corresponding end of said member.

2. A flux conducting structure for the armature of a dynamo electric machine, comprising, a thin-walled tubular member of relatively large mean diameter and of magnetizable sheet metal, a tubular core of relatively small mean diameter and located in and coaxially of said member, means connecting one end of the tubular member to the corresponding end of said core, said core and said means being also of magnetizable sheet metal, said core being a composite one made up of a plurality of coaxially-disposed tubes each constructed of a plurality of angularly-spaced sheet metal sections of part-cylindrical form, said means increasing in thickness from a minimum near its connection with said member to a maximum near its connection with said core, a series of angularly-spaced pole pieces carried by the other end of said core, and another such series of pole pieces carried by the corresponding end of said member.

3. A flux conducting structure for the armature of a dynamo electric machine, comprising, a thin-walled member of relatively large mean diameter and of magnetizable sheet metal, means connected to one end of said member and extending radially inward therefrom, a composite core comprising a plurality of coaxially-disposed tubes each constructed of a plurality of angularly-spaced sheet-metal sections of part-cylindrical form, said sections having outturned flanges fixed to said means, pole piece means to which the core sections are connected, and pole piece means fixed to the corresponding end of the peripheral part of said member.

4. A flux conducting structure for the armature of a dynamo electric machine, comprising, a thin-walled member of relatively large mean diameter and of magnetizable sheet metal, means connected to one end of said member and extending radially inward therefrom, a composite core comprising a plurality of coaxially-disposed tubes each constructed of a plurality of angularly-spaced sheet-metal sections of part-cylindrical form, said sections having at one end outturned flanges fixed to said means, pole piece means connected to the other end of said core sections, and pole piece means fixed to the corresponding end of the peripheral part of said member, the flanges of some of said tubes being of greater radial extent than the flanges of other of said tubes, whereby said connecting means and said flanges present a composite flux conductor increasing in thickness from a minimum near its outer periphery to a maximum near its internal periphery.

5. A flux conducting structure for the armature of a dynamo electric machine, comprising, a thin-walled member of relatively large mean diameter and of magnetizable sheet metal, means connected to one end of said member and extending radially inward therefrom, a composite core comprising a plurality of coaxially-disposed tubes each constructed of a plurality of angularly-spaced sheet-metal sections of part-cylindrical form, said sections having at one end outturned flanges abutting said means, a series of fastening devices interconnecting the flanges and means, said flanges having slots therethrough located one between each pair of adjacent fastening devices and having one of its extremities located at a greater radial distance and one at a less radial distance than the adjacent fastening device, pole piece means connected to the other end of the core sections, and pole piece means fixed to the corresponding end of the peripheral part of said member.

6. A flux conducting structure for the armature of a dynamo electric machine, comprising, a thin-walled member of relatively large mean diameter and of magnetizable sheet metal, said member being substantially cup-shaped, a composite core of relatively small mean diameter and comprising a plurality of coaxially-disposed tubes each constructed of a plurality of angularly-spaced sheet-metal sections of part-cylindrical form fixed at one end to the end wall of said cup-shaped member, pole piece means to which the core sections are connected, and pole piece means fixed to the corresponding end of the peripheral part of said cup-shaped member.

7. A flux conducting structure for the armature of a dynamo electric machine, comprising, a thin-walled member of relatively large mean diameter and of magnetizable sheet metal, said member being substantially cup-shaped, a composite core comprising a plurality of coaxially-disposed tubes each constructed of a plurality of angularly-spaced sheet-metal sections of part-cylindrical form, said sections having outturned flanges fixed to the end wall of said cup-shaped member, pole piece means to which the core sections are connected, and pole piece means fixed to the corresponding end of the peripheral part of said cup-shaped member.

8. A flux conducting structure for the armature of a dynamo electric machine, comprising, a thin-walled member of relatively large mean diameter and of magnetizable sheet metal, said member being substantially cup-shaped, a composite core comprising a plurality of coaxially-disposed tubes each constructed of a plurality of angularly-spaced sheet-metal sections of part-cylindrical form, said sections having outturned flanges fixed to the end wall of said cup-shaped member, pole piece means to which the core sections are connected, and pole piece means fixed to the corresponding end of the peripheral part of said cup-shaped member, the flanges of some of said tubes being of greater radial extent than the flanges of other of said tubes, whereby the end wall and said flanges present a composite flux conductor increasing in thickness from a minimum near its outer periphery to a maximum near its internal periphery.

9. A flux conducting structure for the armature of a dynamo electric machine, comprising, a thin-walled member of relatively large mean diameter and of magnetizable sheet metal, said member being substantially cup-shaped, a composite core comprising a plurality of coaxially-disposed tubes each constructed of a plurality of angularly-spaced sheet-metal sections of part-cylindrical form, said sections having at one end outturned flanges engaging the end wall of said member, a series of fastening devices interconnecting the flanges and end wall, said flanges having slots therethrough located one between each pair of adjacent fastening devices and having one of its extremities located at a greater radial distance and one at a less radial distance than the adjacent fastening device, pole piece means connected to the other end of the core sections, and pole piece means fixed to the corresponding end of the peripheral part of said cup-shaped member.

10. A flux conducting structure for the armature of a dynamo electric machine, comprising, a thin-walled member of relatively large mean diameter and of magnetizable sheet metal, said member being substantially cup-shaped, a composite core comprising a plurality of coaxially-disposed tubes each constructed of a plurality of angularly-spaced sheet-metal sections of part-cylindrical form, said sections having at one end outturned flanges fixed to the end wall of said cup-shaped member, a series of fastening devices interconnecting the flanges and end wall, said flanges having slots therethrough located one between each pair of adjacent fastening devices and having one of its extremities located at a greater radial distance and one at a less radial distance than the adjacent fastening device, pole piece means connected to the other end of the core sections, and pole piece means fixed to the corresponding end of the peripheral part of said cup-shaped member.

11. A dynamo electric machine, comprising, a magnetic rotor, a shaft connected thereto, a composite core of tubular form and made up of magnetizable metal, said core comprising an inner hollow cylindrical member disposed coaxially of the shaft and rotor and through which said shaft extends and by which the shaft is shielded from eddy currents, a plurality of coaxially-disposed tubes encompassing said member, each constructed of a plurality of angularly-spaced sheet metal sections of part-cylindrical form, a coil mounted on the core, a thin-walled member of magnetizable metal and of substantially the shape of an inverted cup encompassing one end and the periphery of said coil and to which one end of said core is fixed, pole piece means carried by said member near the open end thereof, and pole piece means carried by the corresponding end of said core, said rotor cooperating magnetically with said pole piece means and substantially closing the otherwise open end of said member.

12. A dynamo electric machine, comprising, a coil, relatively stationary means enclosing said coil along one end and along its inner and its outer perimeter and providing a magnetic circuit through and around said coil, said means including inner and outer members extending respectively through and along the outside of said coil, each of said members having a circular series of angularly spaced pole pieces located adjacent the opposite end of said coil, a relatively movable magnetic member at the last-named end of said coil and presenting a circular series of magnets each having a pair of pole shoes arranged so that when one is positioned to connect with a pole piece on the outer member the other is positioned to connect with a pole piece on the inner member and vice versa, the pole pieces of the series being of alternating polarity for cooperation with said pole pieces to direct flux first in one and then in the opposite direction through said coil, said inner member being composed of a series of partly tubular laminations, said relatively stationary means also including a series of disc-like laminations interconnecting said inner and outer members.

KENNETH A. HARMON.